United States Patent
Picha et al.

(10) Patent No.: US 7,181,219 B2
(45) Date of Patent: Feb. 20, 2007

(54) WIRELESS HANDOVER USING ANCHOR TERMINATION

(75) Inventors: Marianne Picha, Batavia, IL (US); Richard N. Talmadge, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 348 days.

(21) Appl. No.: 10/444,002

(22) Filed: May 22, 2003

(65) Prior Publication Data

US 2004/0235477 A1   Nov. 25, 2004

(51) Int. Cl.
*H04Q 7/20* (2006.01)
(52) U.S. Cl. .................. 455/436; 455/445; 455/439
(58) Field of Classification Search ................ 455/436, 455/445
See application file for complete search history.

(56) References Cited

U.S. PATENT DOCUMENTS

| | | | |
|---|---|---|---|
| 3,652,855 A | 3/1972 | McIntyre et al. | |
| 5,106,387 A | 4/1992 | Kittrell et al. | |
| 5,303,026 A | 4/1994 | Strobl et al. | |
| 5,345,941 A | 9/1994 | Rava et al. | |
| 5,491,344 A | 2/1996 | Kenny et al. | |
| 5,569,591 A | 10/1996 | Kell et al. | |
| 5,579,773 A | 12/1996 | Vo-Dinh et al. | |
| 5,601,079 A | 2/1997 | Wong et al. | |
| 5,676,143 A | 10/1997 | Simonsen et al. | |

(Continued)

FOREIGN PATENT DOCUMENTS

| | | |
|---|---|---|
| EP | 0 063431 | 10/1987 |
| EP | 0 623307 | 11/1994 |
| GB | 2 300045 | 10/1996 |
| WO | WO 92/15008 | 9/1992 |
| WO | WO 94/10901 | 5/1994 |

(Continued)

OTHER PUBLICATIONS

JiJi, et al. (1999). *Analytica Chimica Acta* 397: 61-72.

*Primary Examiner*—Lester G. Kincaid
*Assistant Examiner*—Fred A. Casca

(57) ABSTRACT

A method and system for implementing hard handover in wireless telecommunications network. The method includes connecting a call from user equipment in a first radio coverage area to a first media gateway in a mobile switching center via a first connection point in said first media gateway and further connecting the call from the first media gateway to another party via a second connection point in the first media gateway. Then, in response to the user equipment moving from the first radio coverage area to a second radio coverage area, connecting the call from the user equipment in the second radio coverage area to a second media gateway in the mobile switching center, linking the call from the second media gateway to the first media gateway via a third connection point in the first media gateway, and removing the first termination in said first media gateway. The system includes a radio network having a set of radio network subsystems, wherein each of the radio network subsystems includes a set of base stations and a radio network controller for controlling the base stations, a core network having a set of mobile switching centers, wherein each of the mobile switching centers includes a set of media gateways and a media gateway controller for controlling the media gateways, and a set of terminations within each media gateway for establishing a call path between a wireless subscriber and another party, wherein the terminations include at least one anchor termination in a first media gateway for connecting the call to the other party throughout the duration of the call.

26 Claims, 4 Drawing Sheets

U.S. PATENT DOCUMENTS

| | | |
|---|---|---|
| 5,725,480 A | 3/1998 | Oosta et al. |
| 5,865,754 A | 2/1999 | Sevick-Muraca et al. |
| 5,876,339 A | 3/1999 | Lemire |
| 6,024,978 A | 2/2000 | Hauer et al. |
| 6,044,285 A | 3/2000 | Chaiken et al. |
| 6,049,727 A | 4/2000 | Crothall |
| 6,078,828 A | 6/2000 | Yasuda et al. |
| 6,095,982 A | 8/2000 | Richards-Kortum et al. |
| 6,124,597 A | 9/2000 | Shehada et al. |
| 6,157,041 A | 12/2000 | Thomas et al. |
| 6,232,609 B1 | 5/2001 | Snyder et al. |
| 6,240,309 B1 | 5/2001 | Yamashita et al. |
| 6,258,576 B1 | 7/2001 | Richards-Kortum et al. |
| 6,309,884 B1 | 10/2001 | Cooper et al. |
| 6,370,422 B1 | 4/2002 | Richards-Kortum et al. |
| 6,377,842 B1 | 4/2002 | Pogue et al. |
| 6,405,065 B1 | 6/2002 | Malin et al. |
| 6,493,554 B1 * | 12/2002 | Kanerva et al. ............ 455/437 |
| 6,505,059 B1 | 1/2003 | Kollias et al. |
| 6,577,866 B1 * | 6/2003 | Roberts ...................... 455/436 |
| 6,714,789 B1 * | 3/2004 | Oh et al. ................. 455/456.1 |
| 2001/0027104 A1 * | 10/2001 | Hameleers et al. ......... 455/445 |
| 2004/0192294 A1 * | 9/2004 | Pan et al. ................ 455/432.1 |

FOREIGN PATENT DOCUMENTS

| | | |
|---|---|---|
| WO | WO 95/06431 | 3/1995 |
| WO | WO 96/07889 | 3/1996 |
| WO | WO 97/48331 | 12/1997 |
| WO | WO 99/51142 | 10/1999 |
| WO | WO 99/57529 | 11/1999 |

* cited by examiner

WIRELESS HANDOVER USING ANCHOR TERMINATION

BACKGROUND OF THE INVENTION

The present invention relates generally to wireless telecommunications and more particularly to a system and method for implementing hard handover in a wireless telecommunications system such as a Universal Mobile Telecommunications System.

A major effort has been made in the last decade to integrate multimedia capabilities and wireless (or mobile) communications. For example, the International Telecommunications Union and other organizations have been developing standards and recommendations to insure that mobile communications in the future will be able to support multimedia applications of at least the same quality as existing fixed networks. More specifically, many global research projects have been sponsored in order to develop such third generation (3G) mobile systems. 3G systems are intended to provide a global mobility with wide range of services including telephony, paging, messaging, Internet and broadband data. In particular, the 3rd Generation Partnership Project (3GPP) was formed for technical development relating to this new mobile communications technology. The Universal Mobile Telecommunications System (UMTS) is a new radio access network, which is optimized for support of 3G services, including multi media-capable mobile communications.

A UMTS network generally includes a number of base stations, with the base stations being linked (by radio) to user equipment, whose location may change within a given geographical area. However, once the user equipment moves away from the radio coverage area of a particular base station, the call to the user equipment is taken over by another base station. The occurrence of a change of base stations may be detected by any of known means in the art, such as measuring call traffic volume, user equipment transmission power and signal levels, call signal quality, or the position of the user equipment. If such an occurrence is detected, a call "handover" may be necessary.

Under the UMTS standards, which are described in detail in a number of technical specifications put out by 3GPP, under certain conditions the UMTS network must ensure that a hard handover is achieved. Hard handover is generally defined as a category of handover procedures whereby all of the old radio links in the user equipment are abandoned after new radio links are successfully put into service. In other words, mobile connections are to be maintained while the subscriber is moving. However, the UMTS standards do not specify how to implement these important concepts. Thus, there is a need in the art to provide an implementation of the UMTS standards for providing hard handover in a UMTS network. Further, there is a need for a system and method whereby the manipulation of the bearer path during hard handover occurs without impacting the far party endpoint and without concern for any actions transpiring at that other endpoint. The other endpoint could be another wireless subscriber or a public switched customer.

SUMMARY OF THE INVENTION

According to the present invention, a method and system for implementing hard handover in wireless telecommunications network is provided.

In accordance with one aspect of the present invention, the method includes establishing a call from user equipment in a first radio coverage area to a first media gateway in a mobile switching center via a first connection point in said first media gateway, interconnecting the call from the first media gateway to another party via a second connection point in the first media gateway. Then, in response to the user equipment moving from the first radio coverage area to a second radio coverage area, connecting the call from the user equipment in the second radio coverage area to a second media gateway in the mobile switching center, linking the call from the second media gateway to the first media gateway via a third connection point in the first media gateway, and removing the first termination in said first media gateway.

In accordance with another aspect of the present invention, the method further includes responding to the movement of the user equipment from the second radio coverage area to a third radio coverage area by connecting the call from the user equipment in the third radio coverage area to a third media gateway in the mobile switching center, linking the call from the third media gateway to the first media gateway via a sixth connection point in the first media gateway, and removing the third connection point in the first media gateway.

In accordance with yet another aspect of the present invention, the system includes a radio network having a set of radio network subsystems, wherein each of the radio network subsystems includes a set of base stations and a radio network controller for controlling the base stations, a core network having a set of mobile switching centers, wherein each of the mobile switching centers includes a set of media gateways and a media gateway controller for controlling the media gateways, and a set of terminations within each media gateway for establishing a call path between a wireless subscriber and another party, wherein the terminations include at least one anchor termination in a first media gateway for connecting the call to the other party throughout the duration of the call.

The advantages and benefits of the present invention will become apparent to those of ordinary skill in the art upon reading and understanding the following detailed description of the preferred embodiments.

BRIEF DESCRIPTION OF THE DRAWINGS

The drawings are only for purposes of illustrating preferred embodiments and are not to be construed as limiting the invention. The invention may take form in various components and arrangements of components, and in various steps and arrangements of steps, the preferred embodiments of which will be illustrated in the accompanying drawings wherein.

DETAILED DESCRIPTION OF THE INVENTION

It is understood that the specific devices and processes illustrated in the attached drawings and described in the following specification are simply exemplary embodiments of the inventive concepts defined in the appended claims.

Therefore, specific examples and characteristics relating to the embodiments disclosed herein are not to be considered as limiting, unless the claims expressly state otherwise.

Generally, a wireless telecommunications service network provides radio communication to and from user equipment over a large geographical area. Wireless networks typically consist of a number of adjoining geographic regions, which are subdivided into cells. An example of a basic wireless telecommunications service network is illustrated in FIG. 1.

Figure 1:
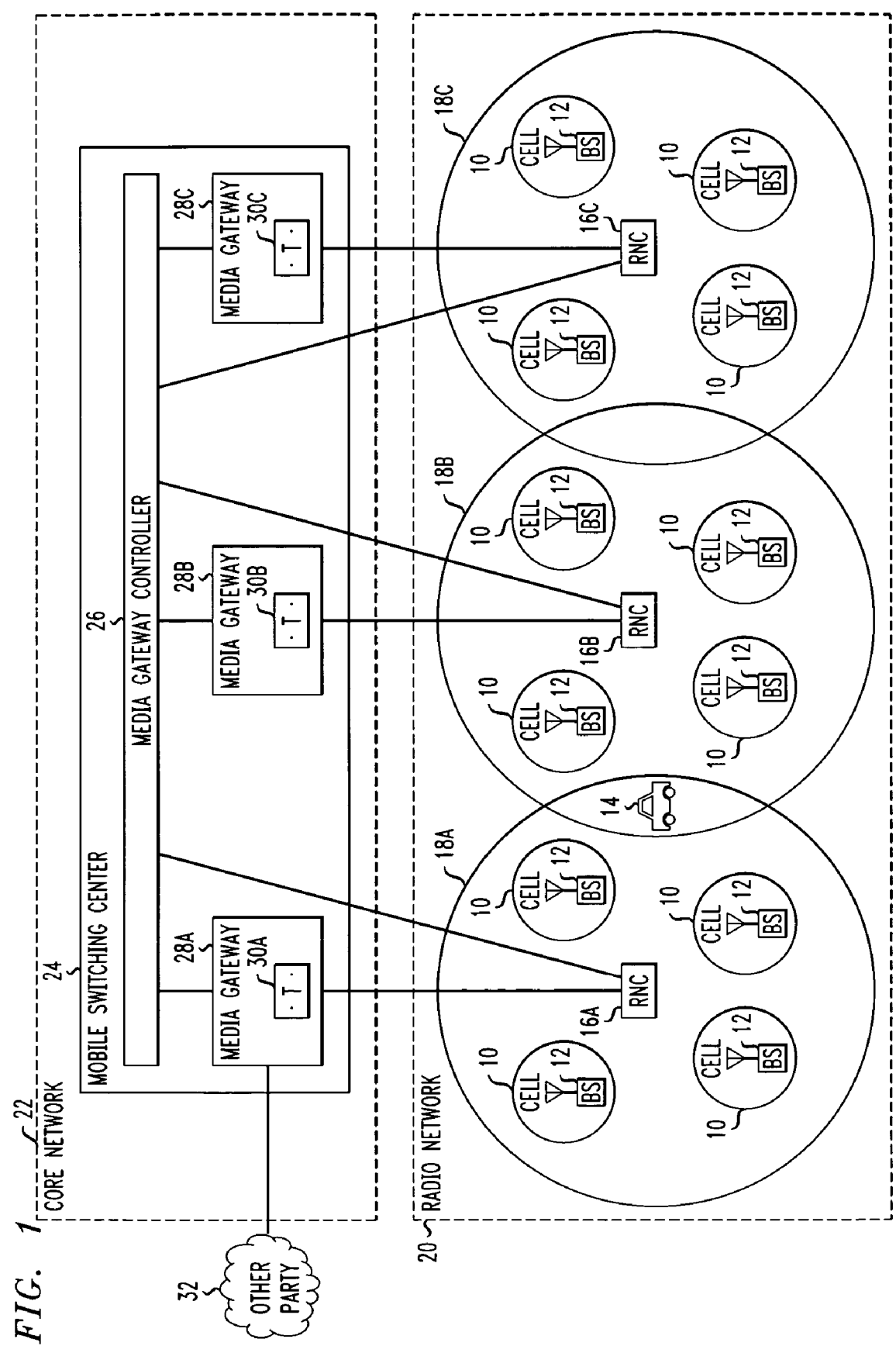
FIG. 1 is a block diagram showing a basic wireless telecommunications service network according to an embodiment of the present invention.
Figure 2:
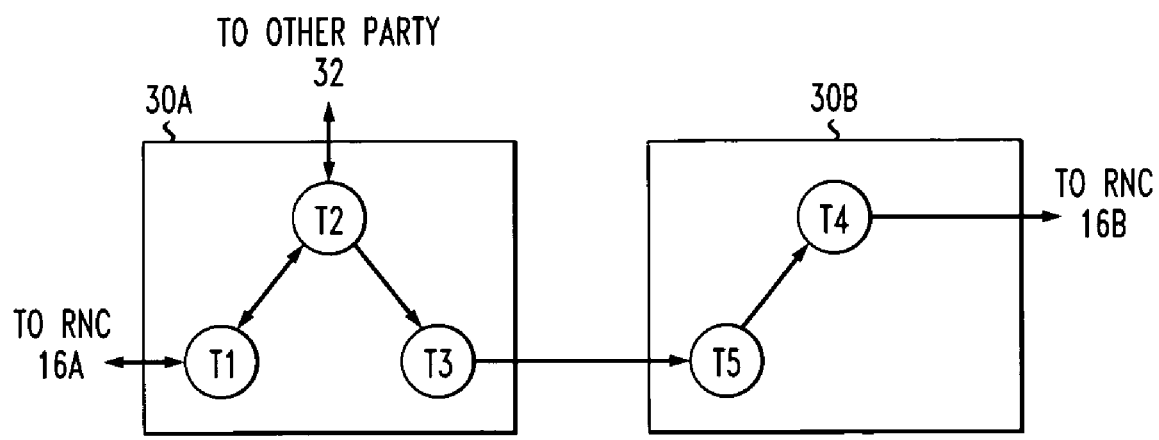
FIGS. 2–5 are a series of block diagrams that collectively illustrate an intra-MSC hard handover procedure according to an embodiment of the present invention; and, FIG. 6 is a call flow diagram representing the intra-MSC hard handover procedure.

As shown in FIG. 1, each cell 10 has a base station (BS) 12, which communicates via radio waves to and from various types of user equipment (UE) 14. The user equipment 14 may be one of a number of mobile communications devices, including a wireless telephone or a portable personal computer with an internal or external modem. As depicted in FIG. 1, wireless telephones are often used by wireless subscribers inside automobiles. Each base station 12 is also connected to a radio network controller (RNC) 16. The radio network controller 16 is in charge of controlling the use and the integrity of the radio resources. Each radio network controller 16 is typically connected to several base stations 12, with each base station 12 serving a different cell 10. Each radio network controller 16 and the base stations 12 that are connected to it form a radio coverage area known in the art as a radio network subsystem (RNS) 18. The radio network subsystem 18 is responsible for the resources and transmission/reception in a set of cells 10. The radio network subsystems 18 collectively form a radio network 20. In FIG. 1, the radio network 20 is defined by three such radio network subsystems, 18A, 18B, and 18C, although there may be any number of radio network subsystems 18 in the radio network 20.

Each radio network controller 16—and thus each radio network subsystem 18—is connected to a core network 22 comprising at least one mobile switching center (MSC) 22. (The core network 22 refers to the part of the UMTS that is independent of the connection technology of the terminal—e.g., radio, wired.) The mobile switching center 24 is typically connected to a plurality of radio network controllers 16. The core network 22 typically contains several mobile switching centers 24, with each mobile switching center 24 typically connected to several other mobile switching centers 24.

As shown in FIG. 1, the mobile switching center 24 includes a media gateway controller 26 and a plurality of media gateways 28. The media gateway controller 26 may comprise a Lucent Softswitch. A Softswitch is a packet switch, well known in the art, which discerns network technology and provides signaling protocols. Thus, the media gateway controller 26 generally provides the necessary call processing intelligence to each media gateway 28 within the mobile switching center 24.

The media gateway 28 enables voice and data traffic to employ multiple media paths and traverse across a converged network. The media gateway 28 provides packet switching, transcoding, and media manipulation, such as tones, conferencing, and splitting, among other things. Acting as a translation unit, the media gateway 28 enables communication between disparate networks. The media gateway 28 is responsible for interconnecting calls to another party 32, who may be another mobile subscriber or a subscriber on the Public Switched Telephone Network (PSTN). In FIG. 1, the mobile switching center 24 includes three media gateways 28A, 28B, and 28C, although there may be any number of media gateways 28 in the mobile switching center 24.

The media gateway controller 26 communicates with the media gateways 28 with standards-based control protocols, such as Megaco, and routes applicable inbound calls to the user's service. Megaco stands for "media gateway control." Megaco (also known as H.248) is a protocol that operates between the media gateway 28 and the media gateway controller 26, including a Softswitch, allowing the media gateway controller 26 to control the media gateway 28. H.248/Megaco is an emerging standard enabling voice, fax and multimedia calls to be switched between the PSTN and emerging IP networks.

Thus, when a subscriber initiates a call on the user equipment 14, the call is routed through the radio network subsystem 18 where the user equipment 14 is located to the mobile switching center 24. Voice, data and video are sent to the appropriate media gateway 28, while certain signals associated with the call are sent to the media gateway controller 26. The media gateway controller 26 sends commands to the media gateway 28 depending on the signal received from the user equipment 14. Meanwhile, for each call a context 30 having a plurality of terminations T is created within the media gateway 28. The terminations T (or connection points) are logical entities within the media gateway 28, which act as sources of media streams. The context 30 is an association between terminations T for sharing media between the terminations. The terminations T can be added or subtracted from the context 30, and they can be moved from one context to another. Each context 30 and all of the terminations T it contains are associated with a single media gateway controller 26.

During a wireless phone call, the user equipment 14 communicates with the closest base station 12 via a certain frequency of radio waves, which is predetermined by the radio network controller 16 for the cell 10 in which the user equipment 14 is located. As the user equipment 14 moves away from the base station 12 originally handling the call, the user equipment 14 typically gets closer to one or more other base stations 12 and the quality of the transmission between the user equipment 14 and the base station 12 handling the call tends to deteriorate. If the quality of transmission decreases significantly, the call must be seamlessly "handed over" to a different base station 12 so that the call may continue between the wireless telephone and the base station to which the call is handed over.

During a wireless phone call, certain measurements may be transmitted to the base station 12, which in turn sends them to its radio network controller 16. The base station 12 may measure such elements as signal strength, signal quality, and the distance between the user equipment 14 and the base station 12. The base station 12 would then relay these measurements to its radio network controller 16 for a determination of whether to hand over the call. If a call is handed over from one base station 12 to another base station 12 in the same radio network subsystem 18, the handover is referred to as an intra-RNS handover. If a call is handed over to a base station 12 in a different radio network subsystem 18 that is connected to the same mobile switching center 24 as the first base station controller 12, then the handover is referred to as an intra-MSC handover. If a call is handed over to a base station 12 in a different radio network subsystem 18 that is connected to a different mobile switching center 24 than the mobile switching center 24 of the first radio network subsystem 18, then the handover is referred to as an inter-MSC handover. Finally, it should be noted that there is a difference between a "soft handover" and a "hard handover." Most handovers are soft handovers. In a soft handover the bearer path adjustment is made entirely within the radio network and the MSC is unaware. This is even possible when handing over between radio network subsystems. With hard handover, all of the old radio links in the user equipment are abandoned after new radio links are successfully put into service.

With reference to FIGS. 1–5, an intra-MSC hard handover is described. Thus, a context 30A having terminations T1 and T2 is created to establish a call path between the radio network controller 16A and the other party 32. Termination T1 is in communication with the radio network controller 16A. The termination T2 (also known as the "anchor" termination) is in communication with the other party 32 and will remain as such throughout duration of the call, no matter where the user equipment 14 moves. However, when the user equipment 14 moves from the original radio network subsystem 18A to a new radio network subsystem 18B, a handover between the radio network controllers 16A and 16B may be necessary to maintain the call. When a handover is necessary, a new termination T3 is created in the context 30A, and a new context 30B is created. The new context 30B includes a pair of new terminations T4 and T5. The terminations T1 and T4 are connected to the radio network controllers 16A and 16B, respectively, while the anchor termination T2 remains connected to the other party 32. Initially, the terminations T3 and T5 are in communication with each other in the downlink direction only. "Downlink" refers generally to the direction from the mobile switching center 24 to the user equipment 14. Sending the downlink requires only that the media is split before being sent to the two destinations. This is simpler to implement than conferencing, which would be required to provide uplink as well as downlink.

Figure 3:
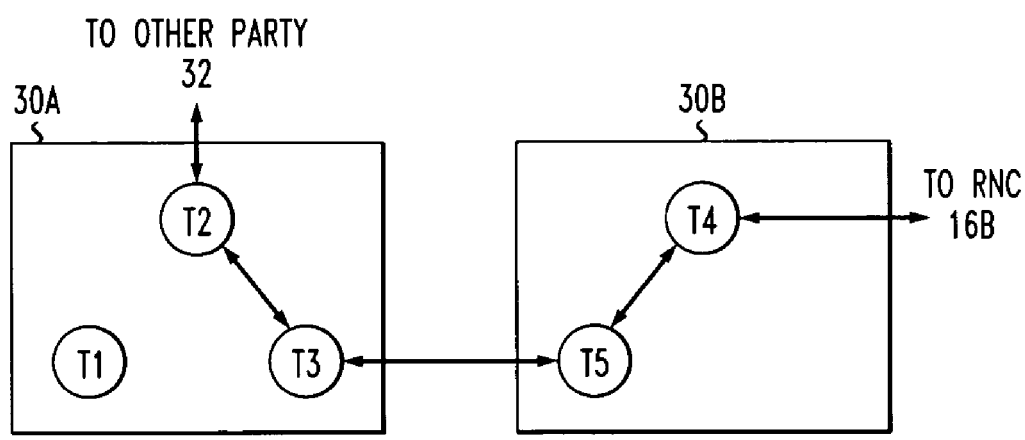

As shown in FIG. 3, once the new context 30B has been created and the call has been connected, the termination T1 may be removed. Accordingly, the termination T2 is connected to the other party 32, while the termination T4 is connected to the radio network controller 16B. Meanwhile, the terminations T3 and T5 are connected to the anchor termination T2.

Figure 4:
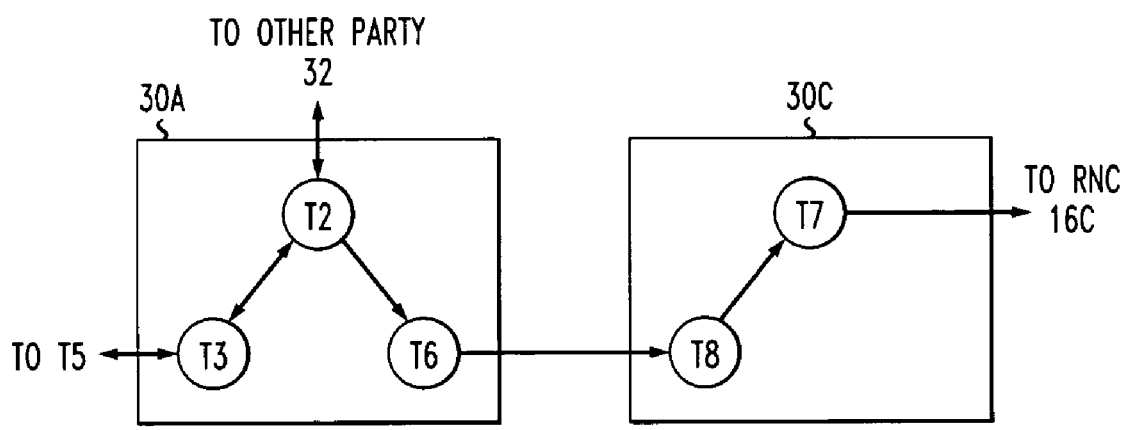
Figure 5:
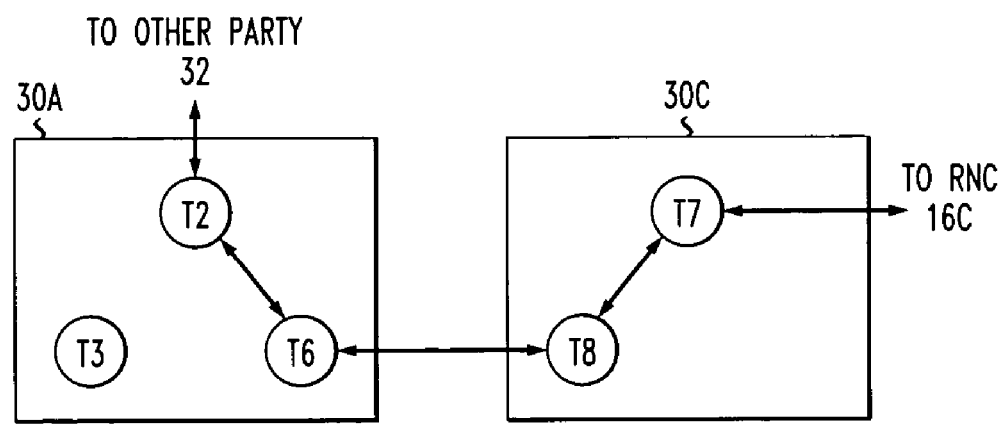

FIGS. 4 and 5 illustrate a subsequent intra-MSC hard handover. As shown in FIG. 4, the anchor termination T2 remains connected to the other party 32. The termination T3 is connected to the previous new context (via termination T5 in context 30B). A new context 30C is created. The new context 30C includes a pair of terminations T7 and T8. Meanwhile, a new termination T6 is created within the original context 30A. The termination T7 is connected to the new radio network controller 16C, while the terminations T6 and T8 are connected in the downlink direction only. As shown in FIG. 5, the anchor termination T2 remains connected to the other party 32, and the termination T3 may be removed.

Figure 6:
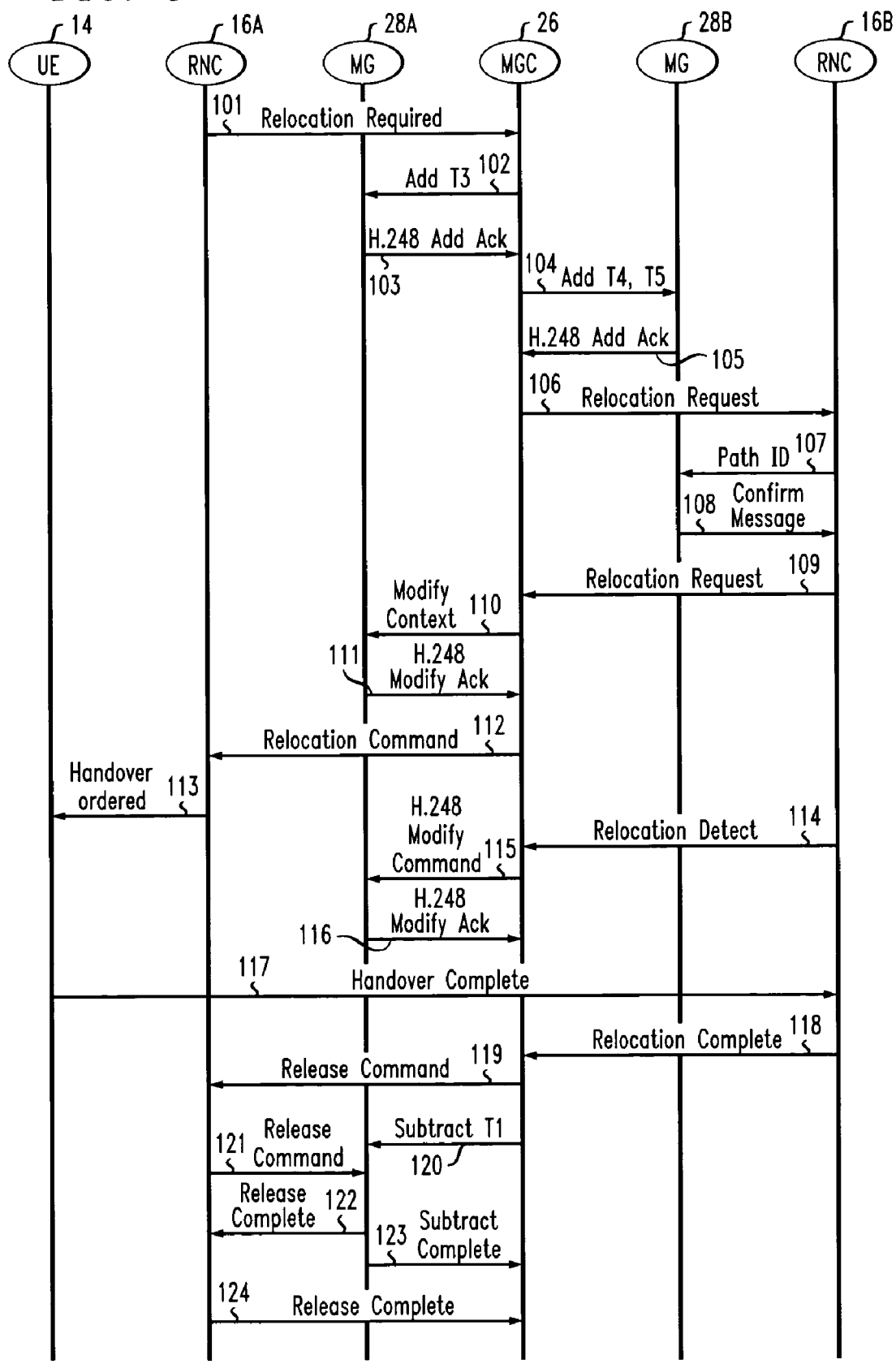

FIG. 6 illustrates a call flow diagram that is especially helpful in understanding the new hard handover process. It is assumed that an initial call path has been established between the user equipment 14 and the other party 32. Now, as the user equipment 14 moves from the coverage area of radio network controller 16A to the coverage area of radio network controller 16B, the media gateway controller 26 in the mobile switching center 24 receives a Relocation Required message (101). During the next four steps, the bearer connection is prepared for handover. First, the media gateway controller 26 identifies the anchor termination T2 in the media gateway 28A and the context 30A for the old call and sends an H.248 Add message to the media gateway 28A to define a new termination T3 (102). The media gateway 28A then returns with an H.248 Acknowledge for the operation (103). The media gateway controller 26 sends an H.248 Add command to the media gateway 28B to set up new terminations T4 and T5 (104). The media gateway 28B responds with an H.248 Add acknowledgement for terminations T4 and T5 (105).

The media gateway controller 26 then sends a Relocation Request message to the radio network controller 16B (106). This message contains necessary information for the assignment request. The radio network controller 16B sends a message containing the assigned path ID (107). The media gateway 28B responds with a Confirm message (108). The radio network controller 16B returns with a Relocation Request Acknowledgement to the media gateway controller 26 (109).

Next, the topology is changed. First, the media gateway controller 26 modifies the context 30A in the media gateway 28A to set up the connection to the new link of a call in the downlink direction (110). This may happen in either a single step or in multiple steps. Next, the media gateway 28A returns an H.248 Modified acknowledgment (111). The media gateway controller 26 then sends a Relocation command to the radio network controller 16A (112). The radio network controller 16A orders the user equipment 14 to hand over the call (113). The radio network controller 16B has detected the user equipment 14 and sends a Relocation Detect to the media gateway controller 26 (114). The media gateway controller 26 sends an H.248 Modify command to the media gateway 28A to modify the topology of the context 30A, thereby creating a full duplex connection and achieving the hard handover (115). The media gateway 28A returns an H.248 Modify acknowledgement to the media gateway controller 26 to acknowledge that the topology has been modified (116). The user equipment 14 signals the radio network controller 16B that it has completed returning (117). The radio network controller 16B sends a Relocation Complete message to the media gateway controller 26 (118). The media gateway controller 26 sends a Release Command to the radio network controller 16A to free the resource (119).

During the next four steps, the old bearer connection is cut. To accomplish this, the media gateway controller 26 first orders the media gateway 28A to remove termination T1 by sending an H.248 Subtract command (120). The radio network controller 16A sends a Release command to the media gateway 28A (121). The media gateway 28A returns a Release Complete to the radio network controller 16A (122). The media gateway 28A responds with an H.248 Subtract acknowledgment to the media gateway controller 26 (123). For the final step, the radio network controller 16A responds to the previous release command with a Release Complete message to the media gateway controller 26 (124).

Thus, the manipulation of the call path during hard handover may occur without impacting the other party endpoint and without concern for any actions transpiring at that endpoint. The invention works for all types of hard handovers (intra-MSC, inter-MSC, UMTS, GSM, 3G to/from 2G). Additionally, it will be appreciated that those skilled in the art will be able to implement handover according to the present invention through various types of hardware and software known in the art.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalence thereof.

What is claimed is:

1. A method for implementing hard handover in a wireless telecommunications network having a plurality of radio coverage areas and a plurality of mobile switching centers, comprising:

connecting a call from user equipment in a first radio coverage area to a first media gateway in a mobile switching center via a first connection point in a first context within said first media gateway;

connecting said call from said first media gateway to a called party via a second connection point in said first context, wherein said second connection point comprises an anchor termination that remains connected to said called party throughout the duration of said call;

responsive to said user equipment moving from said first radio coverage area to a second radio coverage area, connecting said call from said user equipment in said second radio coverage area to a second media gateway in said mobile switching center;

linking said call from said second media gateway to said first media gateway via a third connection point in said first context, wherein said call is connected from said user equipment in said second radio coverage area to said second media gateway via a fourth connection point in a second context within said second media gateway and wherein said call is linked from said second media gateway to said first media gateway via said third connection point in said first media gateway and a fifth connection point in said second context; and removing said first connection point in said first context.

2. The method defined in claim 1 wherein said wireless telecommunications network comprises a Universal Mobile Telecommunications System (UMTS).

3. The method defined in claim 1 wherein said wireless telecommunications network comprises a Global System for Mobile communications (GSM).

4. The method defined in claim 1 wherein said wireless telecommunications network comprises a Code Division Multiple Access (CDMA) system.

5. The method defined in claim 1 wherein said radio coverage area comprises a radio network subsystem having a plurality of base stations and a radio network controller.

6. The method defined in claim 1 wherein said mobile switching center further includes a media gateway controller for controlling said media gateways.

7. The method defined in claim 1 wherein said call is linked from said second media gateway to said first media gateway in the downlink direction only.

8. The method defined in claim 1 further comprising:

responsive to said user equipment moving from said second radio coverage area to a third radio coverage area, connecting said call from said user equipment in said third radio coverage area to a third media gateway in said mobile switching center;

linking said call from said third media gateway to said first media gateway via a sixth connection point in said first media gateway; and removing said third connection point in said first media gateway.

9. The method defined in claim 8 wherein said call is connected from said user equipment in said third radio coverage area to said third media gateway via a seventh connection point.

10. The method defined in claim 9 wherein said call is linked from said third media gateway to said first media gateway in the downlink direction only.

11. The method defined in claim 10 wherein said call is linked from said third media gateway to said first media gateway via said sixth connection point in said first media gateway and an eighth connection point in said third media gateway.

12. A system for implementing hard handover in a wireless telecommunications network, comprising:

a plurality of media gateways; and
a media gateway controller for controlling said plurality of media gateways,
wherein said media gateway controller is operative to:

connect a call from user equipment in a first radio coverage area to a first media gateway in a mobile switching center via a first connection point in a first context within said first media gateway;

connect said call from said first media gateway to a called party via a second connection point in said first context, wherein said second connection point comprises an anchor termination that remains connected to said called party throughout the duration of said call;

responsive to said user equipment moving from said first radio coverage area to a second radio coverage area, connect said call from said user equipment in said second radio coverage area to a second media gateway in said mobile switching center;

link said call from said second media gateway to said first media gateway via a third connection point in said first context, wherein said call is connected from said user equipment in said second radio coverage area to said second media gateway via a fourth connection point in a second context within said second media gateway and wherein said call is linked from said second media gateway to said first media gateway via said third connection point in said first media gateway and a fifth connection point in said second context; and remove said first connection point in said first context.

13. The system defined in claim 12 wherein said wireless telecommunications network comprises a Universal Mobile Telecommunications System (UMTS).

14. The system defined in claim 12 wherein said wireless telecommunications network comprises a Global System for Mobile communications (GSM).

15. The system defined in claim 12 wherein said wireless telecommunications network comprises a Code Division Multiple Access (CDMA) system.

16. A system for implementing hard handover in a wireless telecommunications network having a plurality of radio coverage areas and a plurality of mobile switching centers, comprising:

first connecting means for connecting a call from user equipment in a first radio coverage area to a first media gateway in a mobile switching center via a first connection point in a first context within said first media gateway;

second connecting means for connecting said call from said first media gateway to a called party via a second connection point in said first context, wherein said second connection point comprises an anchor termination that remains connected to said called party throughout the duration of said call;

third connecting means for connecting said call from said user equipment in said second radio coverage area to a second media gateway in said mobile switching center where said user equipment moves from said first radio coverage area to a second radio coverage area;

first linking means for linking said call from said second media gateway to said first media gateway via a third connection point in said first context, wherein said call is connected from said user equipment in said second radio coverage area to said second media gateway via a fourth connection point in a second context within said second media gateway and wherein said call is linked from said second media gateway to said first media gateway via said third connection point in said first media gateway and a fifth connection point in said second context; and first removing means for removing said first connection point in said first media gateway.

17. The system defined in claim 16 wherein said wireless telecommunications network comprises a Universal Mobile Telecommunications System.

18. The system defined in claim 16 wherein said wireless telecommunications network comprises a Global System for Mobile communications (GSM).

19. The system defined in claim 16 wherein said wireless telecommunications network comprises a Code Division Multiple Access (CDMA) system.

20. The system defined in claim 17 wherein said radio coverage area comprises a radio network subsystem having a plurality of base stations and a radio network controller.

21. The system defined in claim 16 wherein said mobile switching center further includes a media gateway controller for controlling said media gateways.

22. The system defined in claim 21 wherein said call is linked from said second media gateway to said first media gateway in the downlink direction only.

23. The system defined in claim 22 further comprising:
fourth connecting means for connecting said call from said user equipment in said third radio coverage area to a third media gateway in said mobile switching center where said user equipment moves from said second radio coverage area to a third radio coverage area;

second linking means for linking said call from said third media gateway to said first media gateway via a sixth connection point in said first media gateway; and second removing means for removing said third connection point in said first media gateway.

24. The system defined in claim 23 wherein said call is connected from said user equipment in said third radio coverage area to said third media gateway via a seventh connection point.

25. The system defined in claim 24 wherein said call is linked from said third media gateway to said first media gateway in the downlink direction only.

26. The system defined in claim 25 wherein said call is linked from said third media gateway to said first media gateway via said sixth connection point in said first media gateway and an eighth connection point in said third media gateway.

* * * * *